(12) United States Patent
Schumacher et al.

(10) Patent No.: US 7,065,626 B2
(45) Date of Patent: Jun. 20, 2006

(54) METHOD FOR CHANGING COMPUTER SYSTEM MEMORY DENSITY

(75) Inventors: Derek Schumacher, Rocklin, CA (US); Vince Leung, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/193,774

(22) Filed: Jul. 10, 2002

(65) Prior Publication Data

US 2004/0010673 A1 Jan. 15, 2004

(51) Int. Cl.
*G06F 12/00* (2006.01)
(52) U.S. Cl. .......................................... 711/172; 713/1
(58) Field of Classification Search ................ 711/154, 711/170–172; 713/1–2
See application file for complete search history.

(56) References Cited

U.S. PATENT DOCUMENTS

| | | | | |
|---|---|---|---|---|
| 5,519,869 A | * | 5/1996 | Payne et al. | 713/2 |
| 5,802,592 A | * | 9/1998 | Chess et al. | 711/164 |
| 6,094,702 A | | 7/2000 | Williams et al. | |
| 6,684,312 B1 | * | 1/2004 | Murayama et al. | 711/170 |
| 2003/0115157 A1 | | 6/2003 | Circenis | |

* cited by examiner

*Primary Examiner*—Matthew D. Anderson

(57) ABSTRACT

A method for changing computer system memory density. It is determined whether a memory unit is scalable to provide a first memory density and a second memory density. Information is received authorizing a change in the memory density. The firmware is updated to indicate the change in memory density.

22 Claims, 4 Drawing Sheets

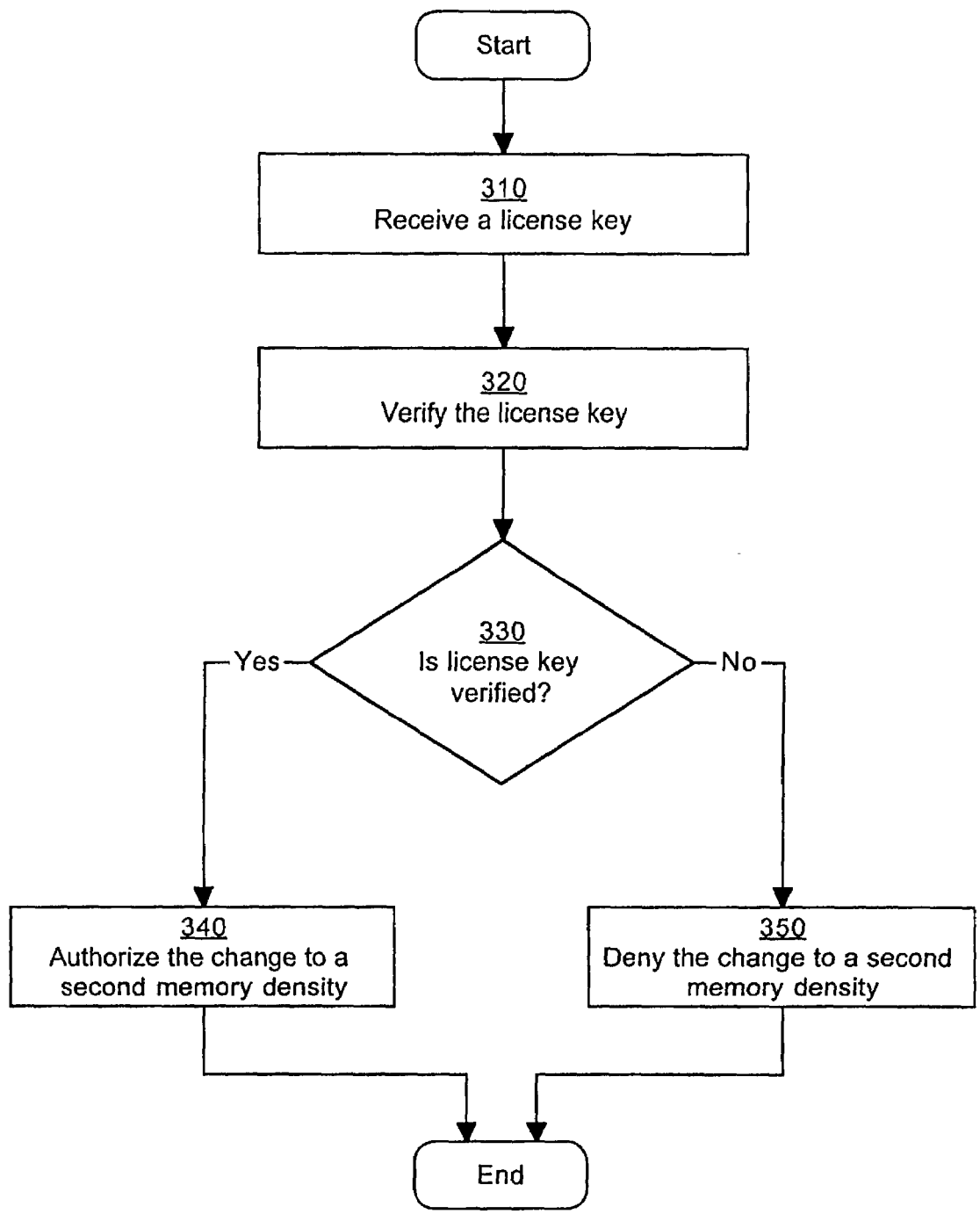

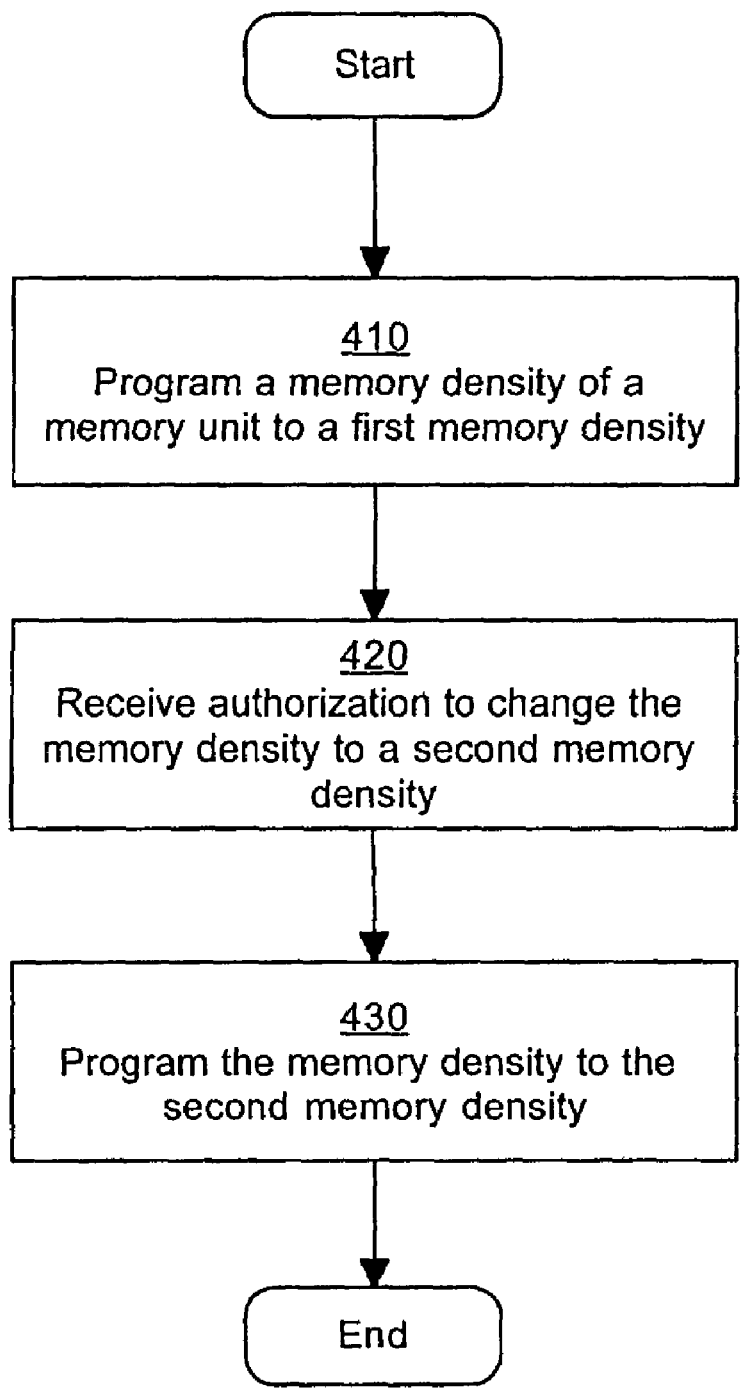

METHOD FOR CHANGING COMPUTER SYSTEM MEMORY DENSITY

FIELD OF INVENTION

Various embodiments of the present invention relate to the field of computer memory.

BACKGROUND OF THE INVENTION

Volatile memory requirements for computer systems vary from user to user. For example, a user having a personal computer for use at their home may be operating software that does not require a large amount of RAM, such as a word processor and a web browser. However, the user may install software that requires more RAM than they initially purchased, such as a graphic intensive video game or a photo editor. Currently, in order to increase the amount of RAM a computer system has, more RAM must be physically added into the computer system.

However, there are many problems associated with the installation of additional RAM. First, the additional RAM must be purchased. RAM is purchased in memory modules, such as DIMMs (dual in-line memory modules) for desktop computers and SODIMMs (Small Outline DIMMs) for use in laptop computers. With DIMMs and SODIMMs, there are numerous chip configurations that yield the same total capacity. In some situations, the computer system is sensitive to the configuration. The process of selecting the correct memory module can be very confusing for the average computer user, requiring a substantial amount of reading and research.

Furthermore, the new memory module must be manually inserted into the computer system. This can be a particularly daunting project for a computer user. If a user desires to have the memory module inserted by a technician, the user may incur a substantial cost. And as with any computer component installation, an installer without experience may incorrectly perform the installation, resulting in further damage and cost to the user.

SUMMARY OF THE INVENTION

A method for changing computer system memory density is presented. It is determined whether a memory unit is scalable to provide a first memory density and a second memory density. Information is received authorizing a change in the memory density. The firmware is updated to indicate the change in memory density.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is a flow chart illustrating steps in a process for receiving information authorizing a change in memory density in accordance with one embodiment of the present invention.

FIG. 4 is a flow chart illustrating steps in an alternative process for changing computer system memory density in accordance with one embodiment of the present invention.

BEST MODE(S) FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1A:
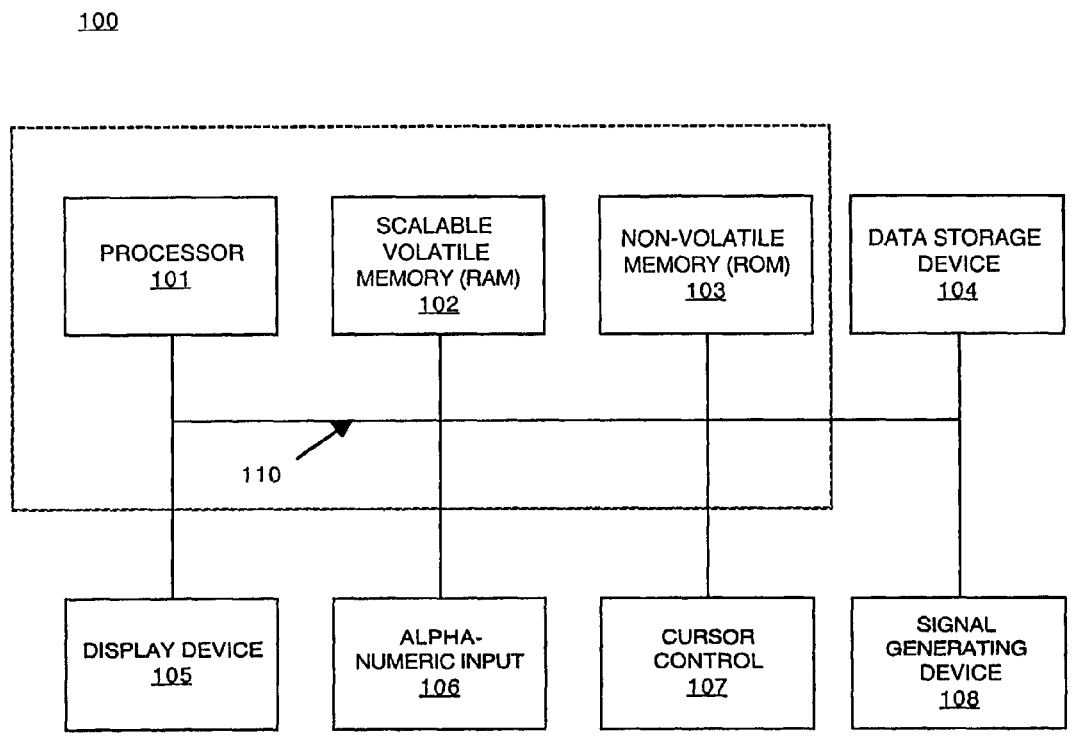
FIG. 1A illustrates a block diagram of an exemplary computer system having a scalable volatile memory unit upon which embodiments of the present invention may be implemented.

FIG. 1A illustrates a block diagram of an exemplary computer system 100 having a scalable volatile memory unit 102 upon which embodiments of the present invention may be implemented. Computer system 100 shows the components of a computer system in accordance with one embodiment of the present invention that provides the execution platform for implementing certain software-based functionality of the present invention. In one embodiment, certain processes and steps of the present invention are realized as a series of instructions (e.g., software program) that reside within computer readable memory units of a computer system and are executed by the processor(s) of system 100. When executed, the instructions cause the computer system 100 to implement a process for changing computer system memory density (e.g., process 200 of FIG. 2 or process 300 of FIG. 3) in accordance with one embodiment of the present invention.

Computer system 100 comprises an address/data bus 110 for communicating information, one or more central processors 101 coupled with the bus 110 for processing information and instructions, a computer readable volatile memory unit 102 (e.g., random access memory, static RAM, dynamic, RAM, etc.) coupled with the bus 110 for storing information and instructions for the central processor(s) 101, and a computer readable non-volatile memory unit 103 (e.g., read only memory, programmable ROM, flash memory, EPROM, EEPROM, etc.) coupled with the bus 110 for storing static information and instructions for the processor(s) 101.

In one embodiment, non-volatile memory unit 103 has stored upon it firmware for managing the configuration of computer system 100. The firmware comprises instructions for limiting the addressable space of volatile memory unit 102. By limiting the addressable space, the memory density of volatile memory unit 102 can be controlled. For example, volatile memory unit 102 is a 512 MB SDRAM memory module (e.g., has a memory density of 512 MB). The firmware can lower the memory density, for example to 256

MB, by limiting the addressable space of volatile memory unit 102. In the present embodiment, processor 101 is only able to access the addressable space as dictated by the firmware. In one embodiment, volatile memory unit 102 is scalable to provide a plurality of memory densities. The plurality of memory densities comprises a first memory density and a second memory density. In one embodiment, the first memory density is less than the second memory density.

In one embodiment, a system command is performed to upgrade the memory density of volatile memory unit 102 from the first memory density to the second memory density. In one embodiment, volatile memory unit 102 is a scalable memory unit initially programmed to operate at the first memory density.

In one embodiment, computer system 100 also includes a computer readable data storage device 104 such as a magnetic or optical disk and disk drive coupled with the bus 110 for storing information and instructions. Optionally, system 100 can include a display device 105 coupled to the bus 110 for displaying information to the computer user, an alphanumeric input device 106 including alphanumeric and function keys coupled to the bus 110 for communicating information and command selections to the central processor(s) 101, a cursor control device 107 coupled to the bus for communicating user input information and command selections to the central processor(s) 101, and a signal generating device 108 coupled to the bus 110 for communicating command selections to the processor(s) 101.

Figure 1B:
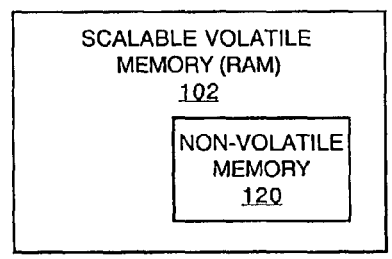
FIG. 1B illustrates a block diagram of a scalable volatile memory unit in accordance with one embodiment of the present invention.

FIG. 1B illustrates a block diagram of a scalable volatile memory unit 102 in accordance with one embodiment of the present invention. In one embodiment, volatile memory unit 102 comprises a computer readable non-volatile memory unit 120 (e.g., read only memory, programmable ROM, flash memory, EPROM, EEPROM, etc.) for storing static information concerning the properties of volatile memory unit 102. In one embodiment, the information comprises an indicator that volatile memory unit 102 is scalable (e.g., can support multiple memory densities). In another embodiment, the information comprises a part number for volatile memory unit 102.

Figure 2:
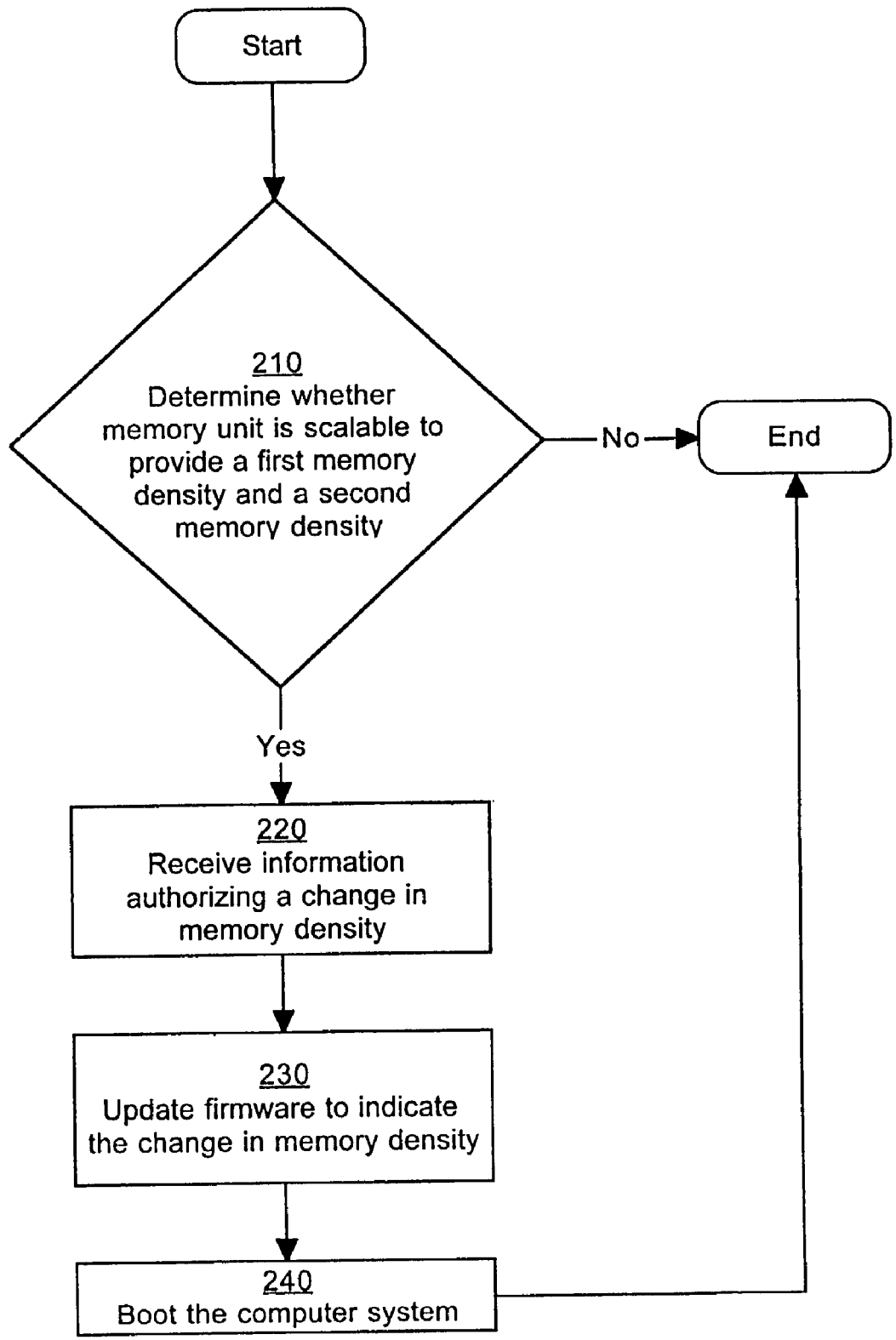
FIG. 2 is a flow chart illustrating steps in a process for changing computer system memory density in accordance with one embodiment of the present invention.

FIG. 2 is a flow chart illustrating steps in a process for changing computer system memory density in accordance with one embodiment of the present invention. In one embodiment, process 200 is carried out by processors and electrical components under the control of computer readable and computer executable instructions. In one embodiment, process 200 is carried out by computer system 100 of FIG. 1A. Although specific steps are disclosed in process 200, such steps are exemplary. That is, the embodiments of the present invention are well suited to performing various other steps or variations of the steps recited in FIG. 2.

At step 210 of process 200, it is determined whether a memory unit of a computer system is scalable to provide a first memory density and a second memory density. In one embodiment, the memory unit is a volatile memory unit (e.g., volatile memory unit 102 of FIG. 1A). In one embodiment, firmware of the computer system comprises information describing whether the memory unit is scalable. In another embodiment, the memory unit comprises a non-volatile memory unit (e.g., non-volatile memory unit 120 of FIG. 1B) which comprises information describing whether the memory unit is scalable. The firmware comprises instructions to access the non-volatile memory to determine whether the memory unit is scalable.

It should be appreciated that a scalable memory unit can provide a plurality of different memory densities. A memory density indicates how much memory the memory unit can store at any one time. A memory unit comprises a set amount of addressable space. By limiting the addressable space, the memory density of the memory unit can be limited. For example, a 512 MB RAM memory unit has 512 MB of addressable space. By limiting the addressable space, for example by instructing the firmware that the memory unit has only 256 MB of addressable space, the memory density can be decreased.

In one embodiment, the memory unit is a scalable memory unit that is initially programmed to operate at a first memory density. A non-volatile memory unit of the memory unit comprises information of the initial program. Firmware of the computer system is directed to access the non-volatile memory unit to determine the memory density.

Provided the memory unit is scalable, as shown at step 220, information is received authorizing a change in the memory density. In one embodiment the change in memory density is from a first density to a second density. In one embodiment, the first density is less than the second density, such that a change from the first density to the second density provides a greater memory density in the memory unit. For example, a scalable memory unit is manufactured with 1 GB (e.g., 1024 MB) of addressable space. The memory unit is initially programmed, either in the firmware of the computer system or in non-volatile memory of the memory unit, as having 256 MB of addressable space. Information is received authorizing a change in memory density to 512 MB.

FIG. 3 is a flow chart illustrating steps in a process 300 for receiving information authorizing a change in memory density in accordance with one embodiment of the present invention. At step 310, a license key is received. In one embodiment, the license key is obtained by contacting the manufacturer of the computer system and purchasing the license key.

At step 320, a verification that the license key is performed. In one embodiment, it is determined whether license key matches encrypted data based on the product number and the serial number of the memory unit. The encrypted data is based on an encryption algorithm generated by the manufacturer. At step 330, it is determined whether the license key is verified.

Provided the license key is verified, as shown at step 340, changing the memory density of the memory unit to the second memory density is authorized, and process 200 of FIG. 2 proceeds to step 230. Alternatively, provided the license key is not verified, as shown at step 350, changing the memory density of the memory unit to the second memory density is denied, and process 200 of FIG. 2 ends.

With reference to FIG. 2, at step 230 the firmware is updated to indicate the change in the memory density. In one embodiment, the change is from the first memory density to a second memory density. In one embodiment, the first memory density is less than the second memory density. As described above, the memory density recited in the firmware limits the addressable space of the memory unit. As such, adjusting the firmware can control the addressable space of the memory unit. It should be appreciated that changes made in the firmware are saved across system boots of the computer (e.g., saved in non-volatile memory).

At step 240, the computer system is booted. In one embodiment, booting the computer system effectuates the changes made in the firmware. In order to change the addressable space as saved in the firmware, it may be necessary to reboot the computer system.

FIG. 4 is a flow chart illustrating steps in an alternative process 400 for changing computer system memory density in accordance with one embodiment of the present invention. At step 410, a memory density of the memory unit is programmed to a first memory density. In one embodiment, the programming to the first memory density is performed upon installation of the memory unit into the computer system. In one embodiment, the memory density is programmed into the firmware of the computer system. In another embodiment, the memory density is programmed into non-volatile memory of the scalable memory unit for access be the firmware of the computer system.

At step 420, authorization is received to change the memory density from the first memory density to the second memory density. In one embodiment the change in memory density is from the first density to a second density. In one embodiment, the first density is less than the second density, such that a change from the first density to the second density provides a greater memory density in the memory unit. In one embodiment, a process for receiving information authorizing a change in memory density (e.g., process 300 of FIG. 3) is performed to determine whether authorization to change the memory density is received.

At step 430, the memory density is programmed to the second memory density. In one embodiment, the firmware is programmed to account for the change to the second memory density. As described above, the memory density recited in the firmware limits the addressable space of the memory unit. As such, adjusting the firmware can control the addressable space of the memory unit. It should be appreciated that changes made in the firmware are saved across system boots of the computer (e.g., saved in non-volatile memory).

It should be appreciated that process 200 of FIG. 2 and process 400 of FIG. 4 may be performed multiple times on the same memory unit. For example, a 1 GB memory unit (e.g., 1024 MB) is initially set with a memory density of 256 MB. A user then obtains a license key to upgrade the memory density to 512 MB. At a later time the user may purchase a license key for upgrading the memory density to the full capacity of 1 GB.

Embodiments of the present invention provide a method for increasing memory density of a computer system without physically adding or changing memory units. Furthermore, memory density can be increased without the services of a field support engineer or technician present. As such, changing the memory density results in less computer system downtime (e.g., turning power off, add/change memory unit, turn power back on) and at a lower cost than previously. Furthermore, embodiments of the present invention, a method for changing computer system memory density, are thus described. While the present invention has been described in particular embodiments, it should be appreciated that the present invention should not be construed as limited by such embodiments, but rather construed according to the below claims.

What is claimed is:

1. A method for changing computer system memory density, said method comprising:
   determining whether an installed and addressable memory module is scalable to provide a first memory density and a second memory density without requiring the physical installation of an additional memory module into said computer system, wherein said first memory density and said second memory density provide different amounts of addressable space of said memory module, wherein said memory module is a volatile memory module;
   receiving information authorizing a change in said memory density; and
   updating firmware to indicate said change in said memory density such that a memory density of said addressable space is controlled by said firmware.

2. The method as recited in claim 1 wherein said first memory density is less than said second memory density.

3. The method as recited in claim 2 wherein said change in said memory density is from said first memory density to said second memory density.

4. The method as recited in claim 1 wherein said memory module is a scalable memory module that is initially programmed to operate at said first memory density.

5. The method as recited in claim 1 wherein said receiving said information authorizing said change in said memory density comprises:
   receiving a license key for said memory module;
   verifying said license key; and
   provided said license key is verified, authorizing said change in said memory density.

6. The method as recited in claim 3 wherein said first memory density is 256 megabytes and said second memory density is 512 megabytes.

7. The method as recited in claim 1 further comprising booting said computer system, wherein upon said booting said computer said change is performed.

8. The method as recited in claim 1 wherein said memory module is a Random Access Memory (RAM) memory module.

9. A computer system comprising:
   a bus;
   a computer-readable memory coupled to said bus;
   a processor coupled to said bus; and
   an installed and addressable memory module coupled to said bus, said memory module scalable to provide a plurality of memory densities without requiring the physical installation of an additional memory module into said computer system, wherein said plurality of memory densities provide different amounts of addressable space of said memory module, wherein said memory module is a volatile memory module.

10. The computer system as recited in claim 9 wherein a current memory density of said plurality of memory densities is stored in firmware of said computer system such that said current memory density of said addressable space is controlled by said firmware.

11. The computer system as recited in claim 9 wherein said plurality of memory densities comprises a first memory density and a second memory density, wherein said first memory density is less than said second memory density.

12. The computer system as recited in claim 11 wherein an upgrade of said scalable memory module from said first memory density to said second memory density is performed by a system command.

13. The computer system as recited in claim 9 wherein said memory module is a Random Access Memory (RAM) memory module.

14. The computer system as recited in claim 11 wherein said memory module is a scalable memory module initially programmed to operate at said first memory density.

15. The computer system as recited in claim 11 wherein said first memory density is 256 megabytes and said second memory density is 512 megabytes.

16. The computer system as recited in claim 11 wherein said processor performs a method for changing computer system memory density, said method comprising:
   receiving information authorizing a change in said memory density; and
   updating firmware to indicate said change in said memory density.

17. A computer-readable medium having computer-readable program code embodied therein for causing a computer system to perform a method for changing computer system memory density, said method comprising:
   programming a memory density of an installed and addressable memory module to a first memory density, wherein said memory module is a volatile memory module;
   receiving authorization to change said memory density from said first memory density to a second memory density, wherein said first memory density and said second memory density provide different amounts of addressable space of said memory module without requiring the physical installation of an additional memory module into said computer system; and
   programming said memory density to said second memory density.

18. The computer-readable medium as recited in claim 17 wherein said programming to said first memory density is performed upon installation of said memory module into said computer system.

19. The computer-readable medium as recited in claim 17 wherein said first memory density is less than said second memory density.

20. The computer-readable medium as recited in claim 17 wherein said memory module is a scalable memory module that is initially programmed to operate at said first memory density.

21. The computer-readable medium as recited in claim 17 wherein said first memory density is 256 megabytes and said second memory density is 512 megabytes.

22. The computer-readable medium as recited in claim 17 wherein said memory module is a Random Access Memory (RAM) memory module.

* * * * *